United States Patent
Hirsch et al.

(10) Patent No.: US 7,882,173 B2
(45) Date of Patent: Feb. 1, 2011

(54) INTERACTIVE REMOTE COMMAND EXECUTION OVER A STATELESS CLIENT/SERVER NETWORK PROTOCOL

(75) Inventors: Peter D. Hirsch, Danville, CA (US); Praveen Jani, Cupertino, CA (US); Anup Katariya, Sunnyvale, CA (US); Andrey Prigogin, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 12/164,927

(22) Filed: Jun. 30, 2008

(65) Prior Publication Data

US 2009/0327468 A1   Dec. 31, 2009

(51) Int. Cl.
G06F 15/16 (2006.01)
G06F 15/173 (2006.01)

(52) U.S. Cl. ................. 709/203; 707/999.202; 709/223; 714/100; 715/700; 718/100

(58) Field of Classification Search .......... 707/999.202; 709/203, 223; 714/100; 715/700; 718/100
See application file for complete search history.

(56) References Cited

U.S. PATENT DOCUMENTS

| | | | | |
|---|---|---|---|---|
| 4,829,423 | A * | 5/1989 | Tennant et al. ................ 704/8 |
| 5,892,905 | A * | 4/1999 | Brandt et al. ................. 726/11 |
| 6,901,425 | B1 * | 5/2005 | Dykes et al. ................ 709/203 |
| 7,107,294 | B2 * | 9/2006 | Romanufa et al. ................ 1/1 |
| 7,403,901 | B1 * | 7/2008 | Carley et al. ................... 705/2 |
| 2004/0255296 | A1 * | 12/2004 | Schmidt et al. ................ 718/100 |
| 2005/0086648 | A1 * | 4/2005 | Andrews et al. ............ 717/135 |
| 2005/0149526 | A1 * | 7/2005 | Wiser et al. ..................... 707/8 |
| 2006/0101139 | A1 * | 5/2006 | Hornreich et al. .......... 709/224 |
| 2006/0136920 | A1 * | 6/2006 | Nagano et al. .............. 718/100 |
| 2006/0265662 | A1 | 11/2006 | Gertzen |
| 2007/0016639 | A1 * | 1/2007 | Mukundan et al. .......... 709/203 |
| 2007/0174419 | A1 * | 7/2007 | O'Connell et al. .......... 709/217 |
| 2007/0202884 | A1 * | 8/2007 | Nykanen et al. ............ 455/455 |
| 2007/0214239 | A1 * | 9/2007 | Mechkov et al. ............ 709/219 |
| 2008/0010338 | A1 * | 1/2008 | Curtis et al. ................ 709/203 |
| 2008/0010590 | A1 * | 1/2008 | Curtis et al. ................ 715/246 |
| 2008/0065769 | A1 * | 3/2008 | Curtis et al. ................ 709/226 |
| 2008/0104025 | A1 * | 5/2008 | Dharamshi et al. ............. 707/3 |
| 2008/0140722 | A1 * | 6/2008 | Jakobovits ............... 707/104.1 |
| 2008/0147834 | A1 * | 6/2008 | Quinn et al. ................ 709/223 |
| 2008/0250332 | A1 * | 10/2008 | Farrell et al. ................ 715/753 |
| 2008/0270412 | A1 * | 10/2008 | Udayasankar et al. ......... 707/10 |
| 2008/0301228 | A1 * | 12/2008 | Flavin ........................ 709/204 |

(Continued)

*Primary Examiner*—Alina N. Boutah
(74) *Attorney, Agent, or Firm*—Yee & Associates, P.C.; John R. Pivnichny

(57) ABSTRACT

A mechanism for executing a remote command in a stateless client/server environment that provides progress information and allows user input that can influence command execution. A server receives a command request thread and processes the thread asynchronously by launching an asynchronous thread of execution and creating a conversation identifier for identifying the thread. In executing the command thread, if a conflict in execution of the thread exists, the server halts execution of the thread, creates a user input request to provide a resolution to the conflict and a user input request identifier, and sends the user input request, user input request identifier, and conversation identifier to the client. Responsive to receiving a response from the client, the server processes the user input and resumes execution of the command thread based on the user input.

20 Claims, 10 Drawing Sheets

U.S. PATENT DOCUMENTS

| | | | |
|---|---|---|---|
| 2009/0006543 A1* | 1/2009 | Smit | 709/203 |
| 2009/0063968 A1* | 3/2009 | Wenig et al. | 715/704 |
| 2009/0164581 A1* | 6/2009 | Bove et al. | 709/205 |
| 2009/0249222 A1* | 10/2009 | Schmidt et al. | 715/751 |
| 2010/0135643 A1* | 6/2010 | Fleming | 386/117 |

* cited by examiner

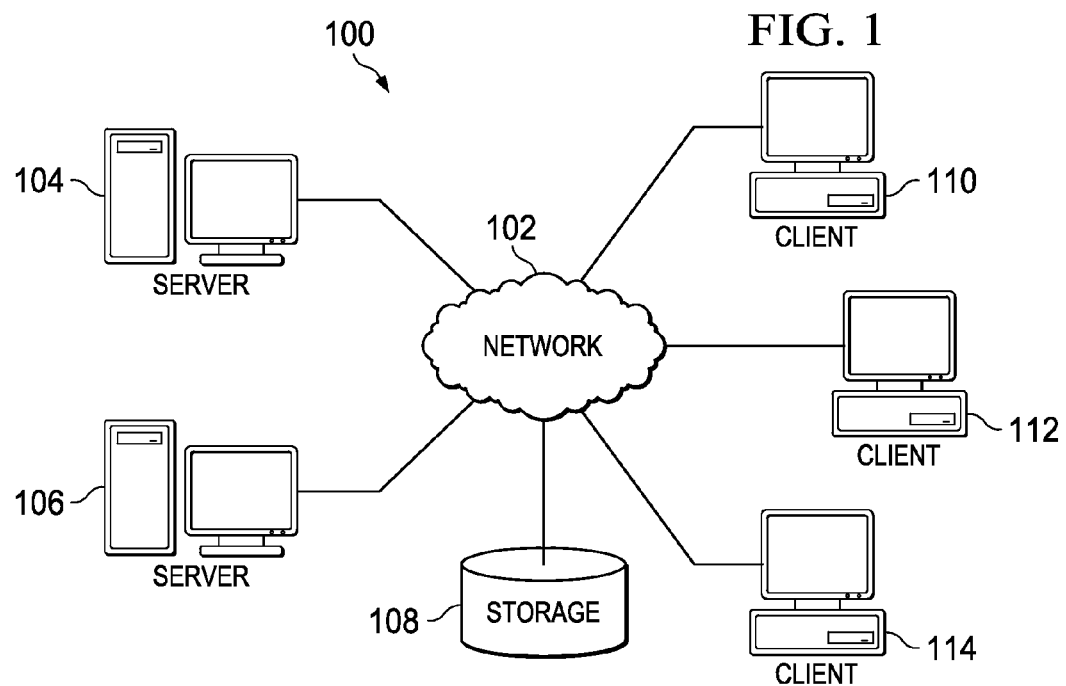
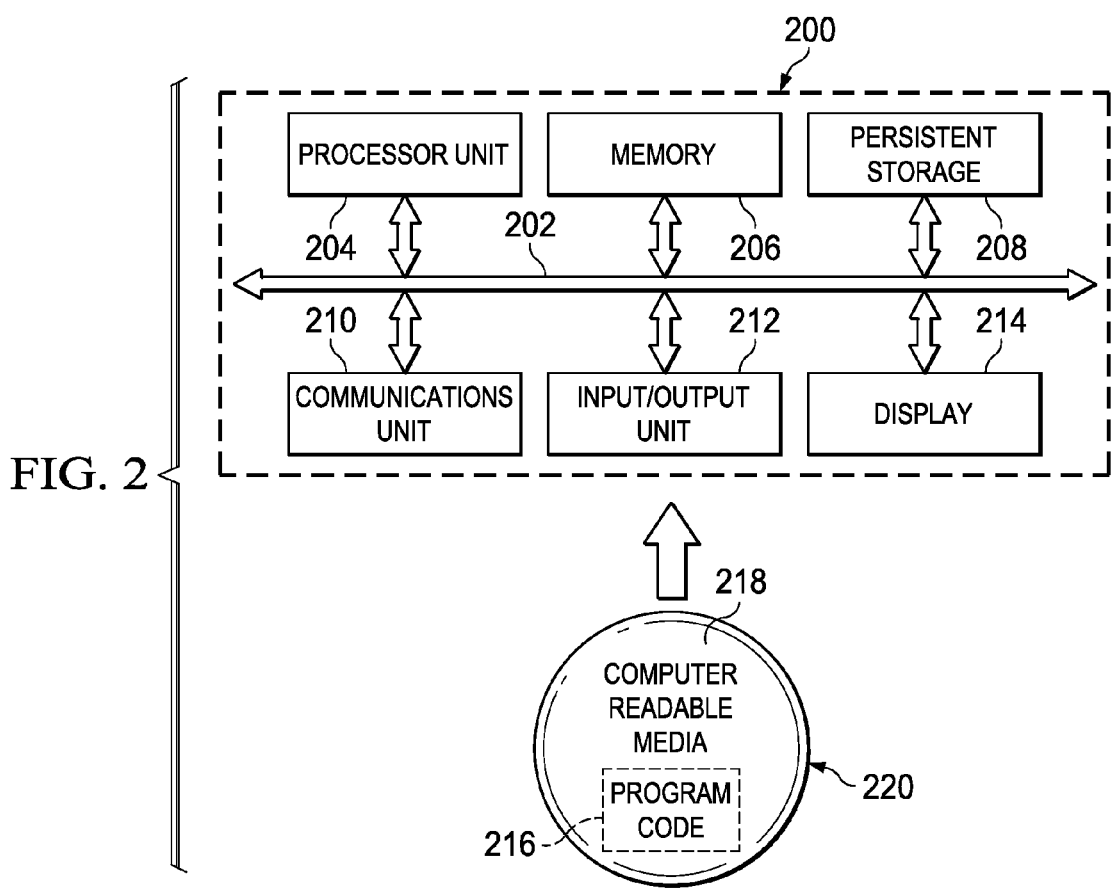

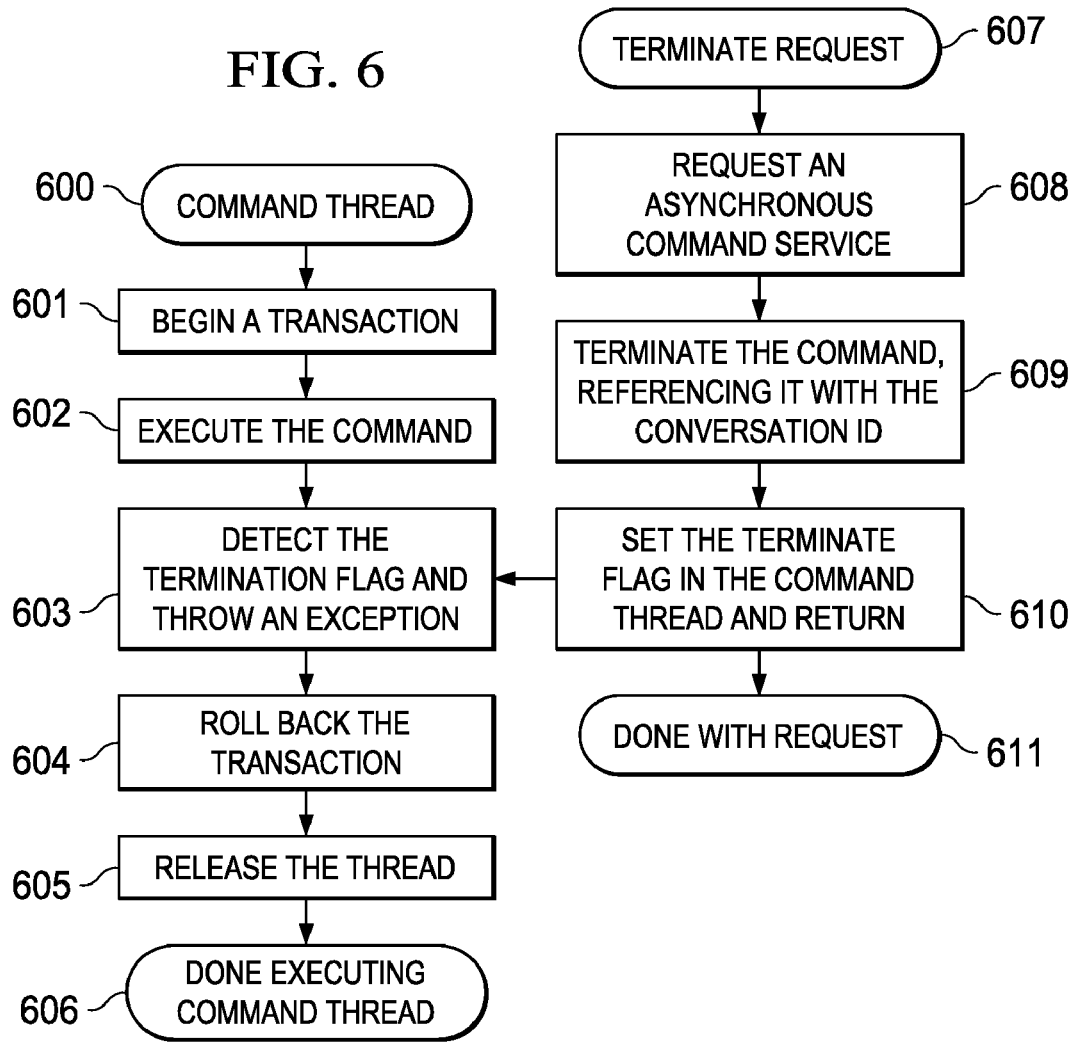

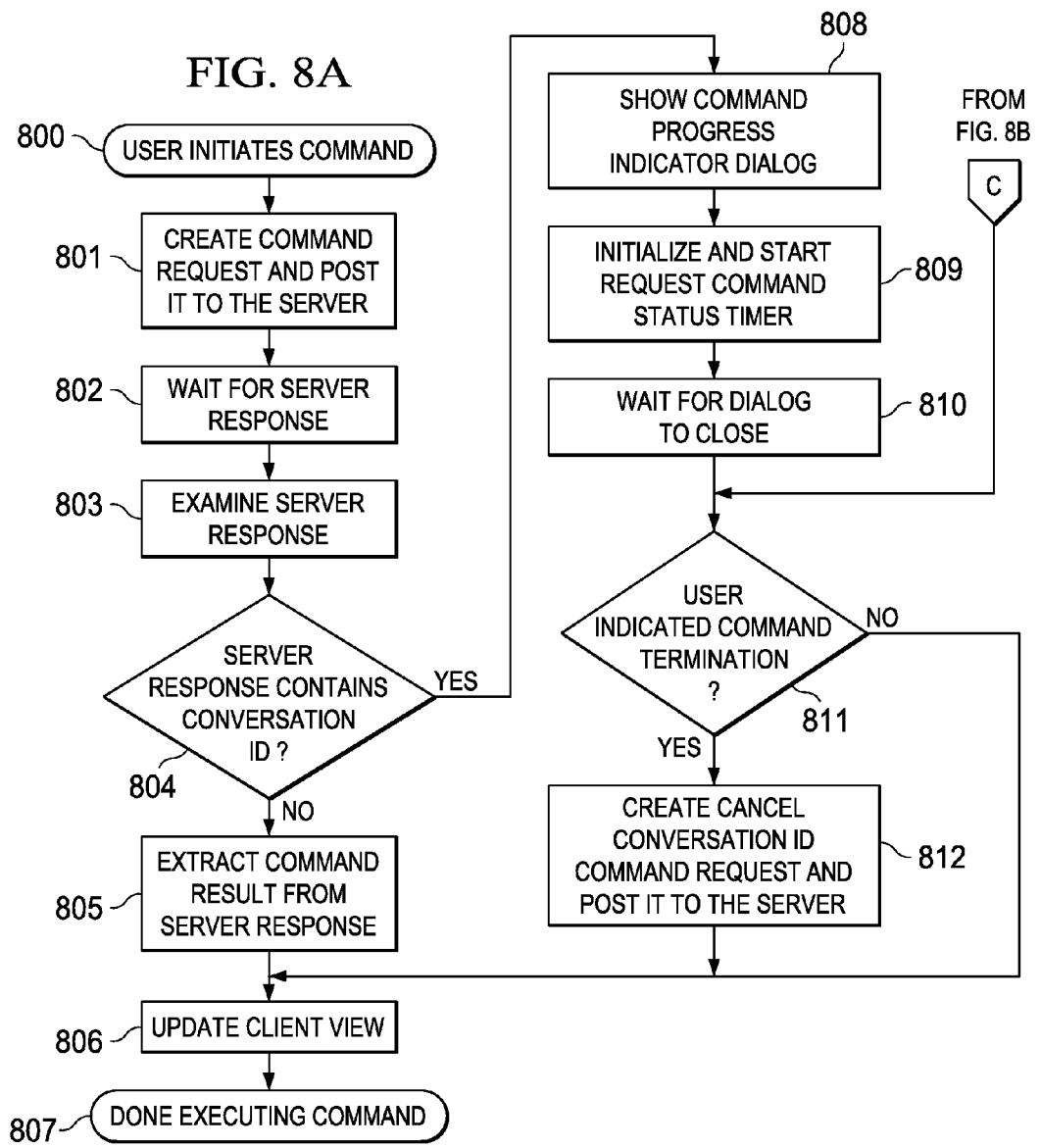

INTERACTIVE REMOTE COMMAND EXECUTION OVER A STATELESS CLIENT/SERVER NETWORK PROTOCOL

BACKGROUND OF THE INVENTION

1. Field of the Invention

The present invention relates generally to executing remote commands initiated from a web browser context, and more specifically to executing and coordinating a collaborative process between a browser and an application server that provides progress of a command and allows optional user input to influence the command execution.

2. Description of the Related Art

AJAX, or asynchronous JavaScript and eXtensible Markup Language (XML), is a group of interrelated web development techniques used for creating interactive web applications that enable information to be exchanged between a web client and web server. In traditional web application interactions, when a user wants to send data to a server (e.g., by filling out a Hypertext Markup Language (HTML) form on a web page), the user submits the data, and the server processes the data and sends a response back to the web page. However, these traditional interactions require that the user wait until the entire web page is refreshed to be able to continue to view or interact further with the web page. Thus, when the user wants to retrieve new data from the server, the user must wait for the whole web page to be reloaded. AJAX addresses this problem by enabling web applications to be written without requiring entire web pages to be reloaded or refreshed each time there is a need to fetch data from the server. AJAX is asynchronous, in that extra data is requested from the server and loaded in the background without interfering with the display and behavior of the existing page. To increase the responsiveness and interactivity of web pages, AJAX uses small JavaScript calls in the form of nonstandard XmlHttpRequest objects to communicate with server-side scripts. An XmlHttpRequest object is an application programming interface that may be used by JavaScript and other web browser scripting languages to transfer XML and other text data between a web page's client-side and server-side. XmlHttpRequest may be used to fetch data in XML, HTML, JavaScript Object Notation (JSON), or plain text.

BRIEF SUMMARY OF THE INVENTION

The illustrative embodiments provide a mechanism for executing a remote command in a stateless client/server environment that provides progress information and allows user input that can influence command execution. When a server receives a request thread for a command from a user at a client, the server determines whether to process the request thread synchronously or asynchronously. If the server processes the request thread asynchronously, the server launches an asynchronous thread of execution for the command to form a command thread. The server also creates a conversation identifier for identifying the command thread. Responsive to executing the command thread, the server determines that a conflict in execution of the command thread exists, and halts execution of the command thread. The server creates a user input request, wherein the user input request includes a user input request identifier, and wherein the user input request requests a user to provide a resolution to the conflict in the execution of the command thread. The server sends the user input request with the user input request identifier and the conversation identifier to the user at the client. Responsive to receiving a response from the client comprising the user input request identifier, the conversation identifier, and a user input that resolves the conflict, the server processes the user input at the server. The server resumes execution of the command thread based on the user input.

BRIEF DESCRIPTION OF THE SEVERAL VIEWS OF THE DRAWINGS

FIG. 1 depicts a pictorial representation of a distributed data processing system in which the illustrative embodiments may be implemented;

FIG. 2 is a block diagram of a data processing system in which the illustrative embodiments may be implemented;

FIG. 6 illustrates a flowchart of a process for terminating an asynchronous command request in accordance with the illustrative embodiments;

FIGS. 8A and 8B illustrate a flowchart of a process for client-side tracking of server command execution in accordance with the illustrative embodiments.

DETAILED DESCRIPTION OF THE INVENTION

Figure 3:
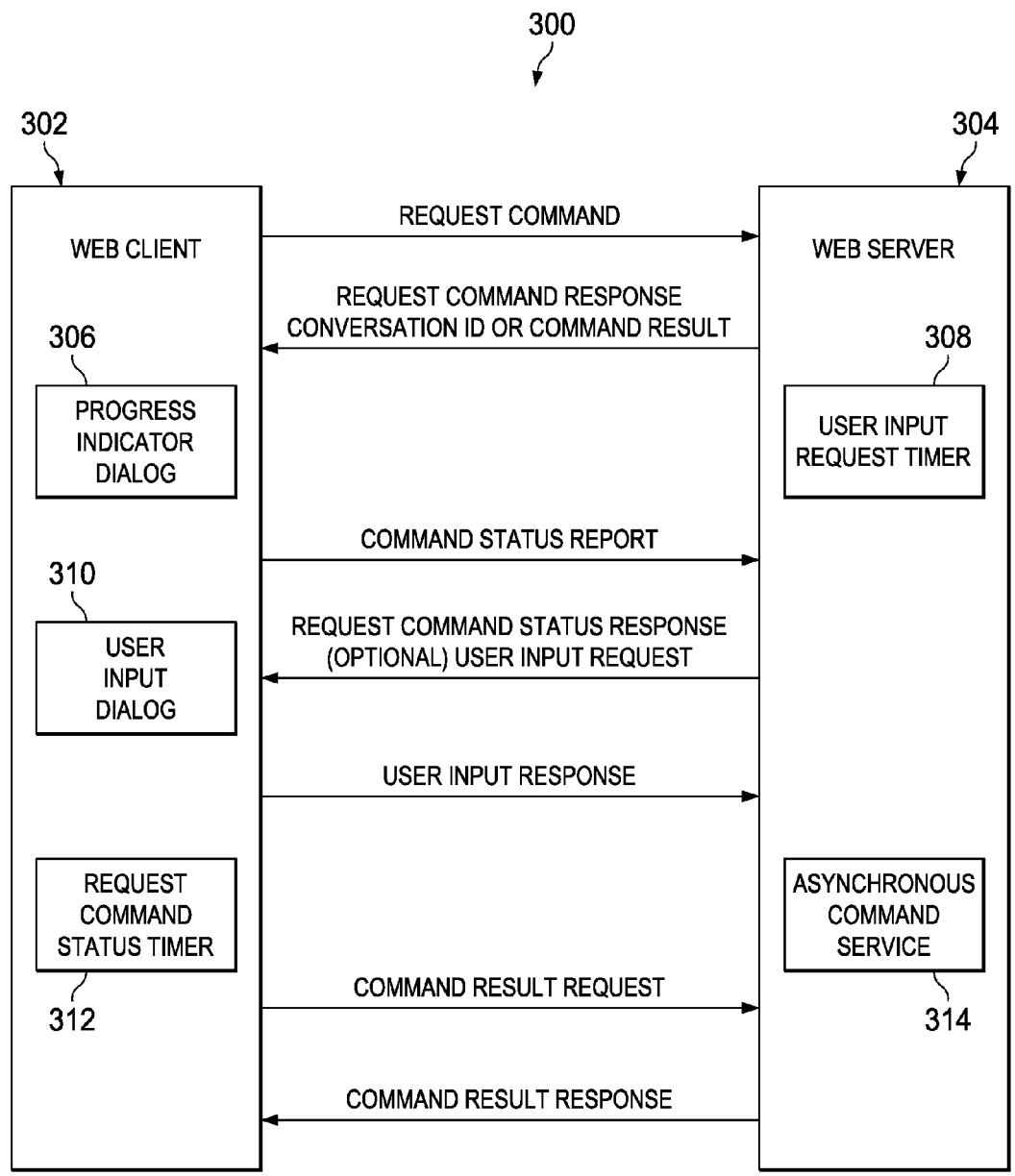
FIG. 3 is a block diagram of an exemplary client-server system in which aspects of the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For instance, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As previously mentioned, the use of XmlHttpRequest objects in an AJAX framework enables web applications to be written without requiring entire web pages to be reloaded or refreshed each time there is a need to fetch data from the web server. While usage of XmlHttpRequest objects is common with AJAX, AJAX currently does not provide a way to execute a remote command on a web server that requires input from the requesting user while the command is executing. Thus, in a client-server environment over HTTP, servers are currently unable to issue a command that asks a user a question, and then execute the command based on the input received from the user within the context of a single transaction. For instance, one example of a remote command that may require a user input is a copy/paste command. When the user sends a request to the web server to execute the command, the copy/paste command may require that the server receive input from the user midway through execution to resolve any name conflicts before the copy/paste command may be committed to the database.

The illustrative embodiments address the problems above by providing a mechanism in a stateless client/server environment over HTTP for executing a remote, long-running command from a web browser. The mechanism of the illustrative embodiments may be implemented in any stateless client/server environment, including web services, that often operates on a stateless protocol. The mechanism provides an asynchronous, browser-based framework for reporting progress to the user and retrieving input from the user when necessary during the course of execution. The mechanism also provides an asynchronous, server-based framework for managing execution of the command and reporting progress while interacting with the web client for user input within the same database transaction. The mechanism further provides a correlation scheme for managing independent commands and input requests, as well as an adaptive polling scheme, which successively reduces the overhead of status calls on the web server for commands as they execute.

With the mechanism of the illustrative embodiments, a typical command request thread from a web client may be mapped into a command transaction thread between the web client and a web server. The command transaction thread executes and coordinates a collaborative process between a client, such as a web browser, and a web server that executes the command. The web browser may initiate the remote command using an XmlHttpRequest object and poll for and interpret the command status received from the web server. The web server executes the remote command and provides the execution status or progress of the command to the web browser. If the web server determines that the command requires input from the user to continue execution of the command, the web server responds to the next command status request from the client with a request to the web browser to prompt for user input that will influence the command execution. The web browser prompts the user for the requested input, and returns the user input to the web server.

With the mechanism of the illustrative embodiments, when the web server receives a remote command request via an XmlHttpRequest object from a user at the web client, the web server creates a command object for the request and launches a separate asynchronous thread of execution for the command at the server. The server also creates a conversation ID for the command that is used to identify the command when the web client subsequently requests the progress or status of the command from the web server. During execution of the command, if the web server determines that user input is needed at any point during command execution, the web server creates an input request object for the command. The input request object comprises a tracking ID that is sent with a command request object to the web client along with the conversation ID. The web server then waits for a response from the web client. The web client may respond to the command request object by sending a command status request for the status or progress of the running command. The web client request may include the tracking ID of the input request object and the conversation ID for the running command. Each time the web server receives a command status request from the web client while the command is executing, the web server locates the execution thread of the command based on the tracking ID and the conversation ID received in the client request and 'wakes up' the thread. The server may then provide a response to the client request which comprises the execution progress and status information for the command and, optionally, a user input request.

The mechanism of the illustrative embodiment also enables a user to terminate a running command (e.g., by selecting a cancel operation) and roll back the transaction. A transaction is used by the application to ensure consistency and integrity of the data stored in a database and file system and isolates the effects of an operation from other users until the transaction is committed. This ensures that other users do not see the effects of changes before they are complete. At the same time, it allows partial changes to be reversed completely if the operation fails or is terminated by the user. The mechanism of the illustrative embodiments allows complete rollback of a command at any point during its operation when terminated by a user, so that none of the pending changes are retained. The mechanism also provides flexibility to commit only partial changes if appropriate for the type of command. When a user wants to terminate a running command, the web client sends a termination command to the web server with the conversation ID of the running command as received by the web server when the running command was started. The termination command sets a flag in the running command thread. When the running command thread detects the termination flag, the running command thread throws an exception and rolls back the transaction. The running command thread and other system resources are released as the web server is finished with the running command.

FIG. 3 is a block diagram of an exemplary client-server system in which aspects of the illustrative embodiments may be implemented. System 300 comprises two distinct tiers—web client 302 and web server 304. Web client 302 is an example client-side data processing system such as client 110, 112, or 114 in FIG. 1. In this particular example, web client 302 may comprise a web browser. Web Server 304 is an example server-side data processing system, such as server 104 or 106 in FIG. 1. Web client 302 is responsible for initiating a command and interpreting the command status returned from web server 304. Web server 304 is responsible for executing the requested command and providing the status of the command execution to web client 302.

In this illustrative example, web client 302 issues an initial command to web server 304. In one embodiment, this command request is issued via an asynchronous XmlHttpRequest object. Web client 302 then waits for the response from web server 304. When web server 304 receives the initial command on the request thread, web server 304 creates a command object and begins execution of the command. Web server 304 also makes a determination of whether to execute the command synchronously, thereby blocking further requests from the web client until execution of the command is complete and a result (e.g., command result) is returned to the web client, or whether to execute the command asynchronously, thereby launching a separate thread of execution and returning only a token (conversation ID) that represents the command result to the web client. Asynchronous command service 314 comprises the logic that controls the command execution for asynchronous execution threads. Allowing for synchronous and asynchronous execution allows flexibility for light-weight commands to execute immediately on the request thread and return without delay, and flexibility for heavy-weight commands to spawn a separate thread to operate asynchronously without making the user wait for the command to complete before the screen is updated. Web server 304 returns a response to web client 302 comprises the either the command result (for a synchronous command execution) or the server-issued conversation ID (for an asynchronous command execution). The unique conversation ID may be subsequently used in all requests and responses between web client 302 and web server 304 to identify an instance of the running command.

Upon receiving a response comprising the conversation ID, web client 302 may display a progress indicator dialog 306 that indicates the progress of the command execution to a user. Web client 302 begins issuing command status requests (also using asynchronous HTTP requests) to web server 304 with a varying polling interval. The varying polling interval may initially comprise a short interval (e.g., less than half a second) and be gradually increased (e.g., to about five seconds) to provide for smooth progress indicator operation. To determine when to poll web server 304 for a new command status, web client 302 may initialize request command status timer 312 which periodically fires an "on request command status" event (each polling interval) that signals to web client 302 that a new command status should be requested.

As the command is executing, web server 304 monitors its own progress so that web server 304 may report the status of the running command to web client 302 when requested. Each time web server 304 receives a command status request from client 302, web server 304 looks up the command using the conversation ID passed in the command status request. Web server 304 then authenticates the session as belonging to the same web client who initiated the command and then requests the execution status from the command. Web server 304 then creates a requested command status response to send to web client 302.

The requested command status response typically comprises command progress or status information and command error information, if any, encountered on web server 304 during command execution. The requested command status response may optionally comprise information (user input request) that signals to web client 302 that a certain user input is required to continue command execution. If, during execution of the command, web server 304 determines that user input is needed to continue command execution, web server 304 creates an input request object with a unique input request tracking ID for tracking the input request and sends the input request object to web client 302. In the meantime, web server 304 blocks the execution thread from continuing while waiting for the response from web client 302. Web server 304 also starts user input request timer 308, so that if a response from web client 302 is not received within an acceptable amount of time, command execution is terminated so as not to tie up server resources for too long.

When web client 302 receives the user input request from web server 304, web client 302 prompts the user to provide input via user input dialog 310. Web client 302 gathers information from the user through user input dialog 310 and then returns the gathered input information via a user input response to web server 304, along with the unique input request tracking ID and conversation ID for the running command.

Upon receiving the user input response from web client 302, web server 304 looks up the running command using the conversation ID. Web server 304 provides the user input information and input request tracking ID to the command execution thread and 'wakes up' the thread so the command can resume executing. The command uses the input request tracking ID to map the user input response from web client 302 to the original user input request. The web client 302 may then continue execution of the command.

When execution of the running command has been completed, web server 304 marks the command status returned to web client 302 as 'complete'. Web client 302 may then request the final results from the command via a command result request. Web client 304 may return the results from the command via a command result response to web client 302. The command, its execution thread, and any associated resources are then freed up on web server 304.

Figure 4A:
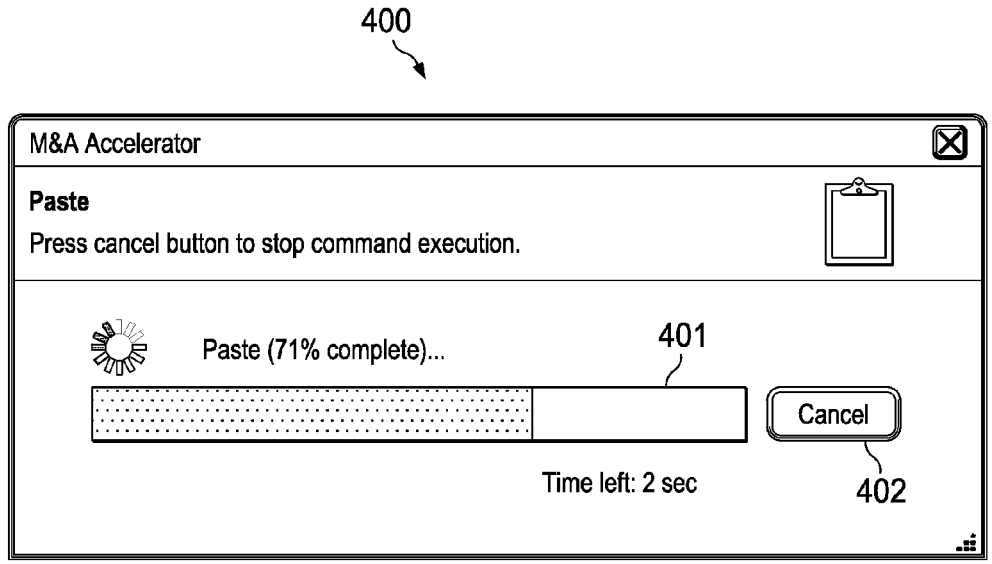
FIGS. 4A and 4B are exemplary screenshots of a graphical user display representing exemplary HTML browser dialogs for an asynchronous command in accordance with the illustrative embodiments.
Figure 4B:
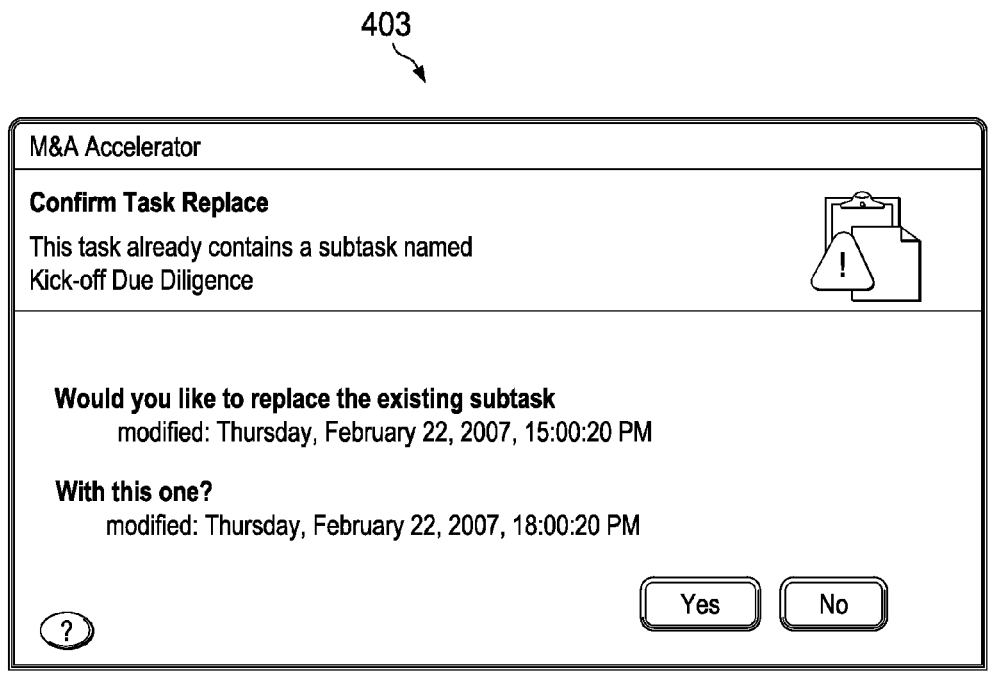

FIGS. 4A and 4B are exemplary screenshots of a graphical user display representing exemplary HTML web browser dialog windows for an asynchronous command in accordance with the illustrative embodiments. In particular, the screenshots illustrate a display mechanism provided by client 302 in FIG. 3 for displaying the status of a paste command to a user and an input mechanism provided by client 302 in FIG. 3 for prompting and collecting user input for influencing command execution.

FIG. 4A displays a sample progress indicator dialog 400 that is displayed on client 302 in FIG. 3 in response to the client initiating a command. Progress indicator dialog 400 is an example of progress indicator dialog 306 in FIG. 3 which displays the progress or status of a command executing on a web server, such as web server 304 in FIG. 3. Progress indicator dialog 400 may be a windowless, HTML display within a browser that is movable within the browser window. In this particular example, the asynchronous command is a clipboard copy/paste operation. Progress dialog 400 is used to indicate the execution progress of the clipboard paste operation. Progress indicator 401 is updated as the clipboard copy/paste operation progresses. Cancel button 402 allows the user to terminate execution of the paste operation at any time.

FIG. 4B displays a sample user input dialog 403 that is displayed on client 302 in FIG. 3 when there is a conflict in the execution of the command. User input dialog 403 is an example of user input dialog 310 in FIG. 3 which is used to collect input from the user needed to resolve a conflict in the execution of the command on web server 304 in FIG. 3. For instance, in the clipboard copy/paste operation of a set of tasks, a naming conflict may exist if a task already exists with the same name as one of the tasks specified in the copy/paste command. If a conflict is encountered during execution of such a copy/paste operation, a secondary confirmation dialog such as user input dialog 403 is displayed to the user. User input dialog 403 is used to prompt the user to provide an input regarding the command. In this illustrative example, user input dialog 403 is used to prompt the user to select whether or not the existing task should be replaced for the copy/paste command operation. The user input collected from user input dialog 403 is returned to web server 304 in FIG. 3 so that execution of the command may continue at the server, while progress indicator dialog 400 in FIG. 4A continues to track the progress of the command execution. Web server 304 in FIG. 3 uses the user input received from user input dialog 403 to determine the execution path of the command initiated by web client 302.

Figure 5A:
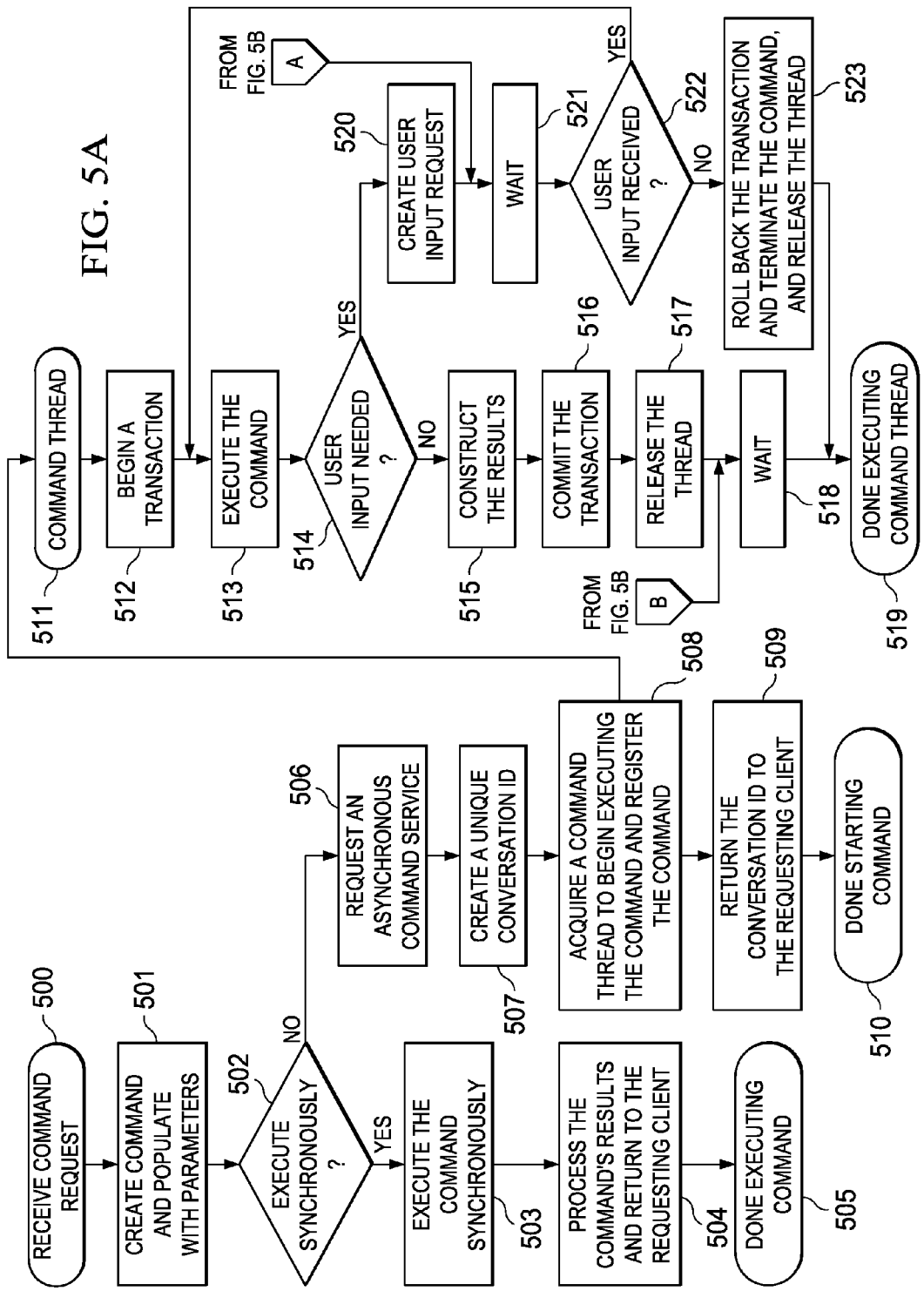
FIGS. 5A and 5B illustrate a flowchart of a process for server requests and command execution in accordance with the illustrative embodiments.
Figure 5B:
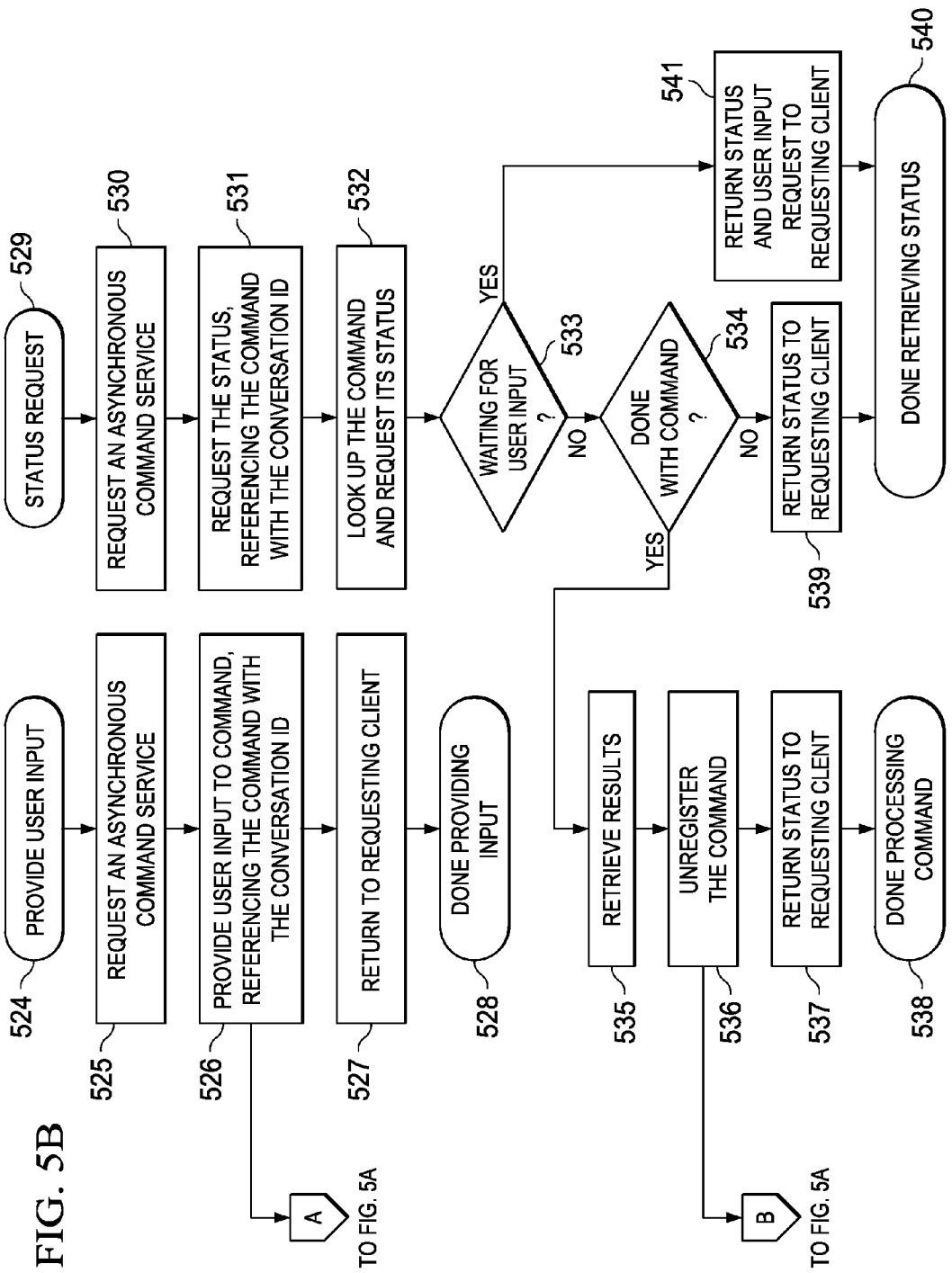

FIGS. 5A and 5B illustrate a flowchart of a process for server requests and command execution in accordance with the illustrative embodiments. The process described in FIGS. 5A and 5B may be implemented in a client-server system, such as system 300 in FIG. 3. The process begins when a client sends a request for a command to the server (step 500). Upon receiving the command request, the server constructs a command object and populates the command object with input parameters that define the particular command operation being performed (step 501).

The server then makes a determination as to whether to execute the command synchronously (step 502). The server makes this determination of whether to execute the command synchronously, such that further requests from the web client are blocked until execution of the command is complete and results are returned to the web client, or whether to execute the command asynchronously, where only a token (conversation ID) that represents the result is returned to the web client. If the server determines to wait to execute the command ('yes' output of step 502), the server executes the command synchronously on the request thread (step 503). The server then waits for and processes the results from the executed command and returns these results to the requesting client (step 504). At this point, the server is done executing the command (step 505), and the command, its execution thread, and any associated resources on the server are subsequently freed up.

Turning back to step 502, if the server determines not to execute the command without requiring the request thread to wait for completion ('no' output of step 502), the server may execute the command asynchronously, create a unique conversation ID that represents the instance of the command on the server, and send a response to the client comprising the conversation ID. Thus, to execute the command asynchronously, the server first requests an asynchronous command service (step 506) and uses the asynchronous command service to create the unique conversation ID (step 507). The conversation ID for the command is used to identify the command when the web client subsequently requests the progress or status of the command from the web server. The server then launches the requested command on a separate command execution thread (step 508). The command execution thread then sends a response to the client comprising the conversation ID of the command (step 509). The server is then finished with the process of starting the command execution (step 510).

As the server requests an asynchronous command service and sends the created conversation ID to the requesting client, the server also starts executing the command execution thread (step 511). The command execution thread creates a new server transaction, which ensures data integrity of any database, cache, and file system operations (step 512). Once the transaction has begun, the command is executed (step 513). As the command executes, the command execution thread keeps track of its execution status in order to be able to service command execution status requests from the requesting client. The command execution thread also determines if user input is needed during the course of executing the command (step 514). An example of such user input comprises a confirmation of a file overwrite. If such user input is needed for the executing command ('yes' output of step 514), the command execution thread creates an input request object with a unique request ID that may be used to correlate the input request to be sent to the requesting client with the user input response received from the client (step 520). Once the input request is created, the command execution thread will wait for input from the client (step 521).

A determination is then made by the command execution thread as to whether user input has been received from the client within a specified amount of time (step 522). This determination may be made using user input request timer 308 in FIG. 3. If user input has been received within the specified amount of time ('yes' output of step 522), the command execution thread returns to step 513 to continue executing the command based on the input provided by the client. However, if user input has not been received within the specified amount of time ('no' output of step 522), the command execution thread rolls back the transaction it created and terminates execution of the command (step 523). The server is then finished executing the command (step 519), and the command, its execution thread, and any associated resources on the server are freed up.

Turning back to step 514, if user input is not needed for the executing command ('no' output of step 514), the command execution thread constructs the results of the executing command (step 515). The command execution thread then commits the transaction (step 516), and the server releases the command execution thread (step 517). The server then waits (step 518) for the client to request the command results (from step 535) and then unregisters the command (from step 536). The server is then finished executing the command (step 519).

Once the command begins executing and the server returns the conversation ID to the caller in step 509, the caller may also begin polling the server for the status of the command (step 529). When the status request is received by the server, the server requests an asynchronous command service (step 530). The server determines the particular command of interest using the conversation ID the server received from the client in the status request in step 529 (step 531). The server validates the requesting client's identity and then looks up the running command to retrieve the command's status based on the using the conversation ID (step 532).

A determination is then made by the server as to whether the server is waiting for input from the client (step 533). If the server is waiting for input from the client ('yes' output of step 533), the server will include the input request with the command status and return this information to the client (step 541). The server is then finished with retrieving the command status (step 540). However, if the server is not waiting for input from the client ('no' output of step 533), the server determines if the command has finished executing (step 534). If the command has not finished executing ('no' output of step 534), the server returns the command status to the client (step 539). The server is then finished with retrieving the command status (step 540).

If the command execution has completed ('yes' output of step 534), the server retrieves the final command results from the command execution (step 535). The server also unregisters the command (step 536) within the asynchronous command service, so that server resources may be freed up (step 518). The server responds to the command status request from the client by sending the command status to the client (step 537). The server is then finished with processing the command (step 540).

If the command execution thread is waiting for user input in step 541, the client provides the user input on another request thread (step 524). When the user input is received at the server, the server requests an asynchronous command service (step 525). The server also provides both the conversation ID and the user input request ID to the command execution thread (step 526). The server then looks up the waiting command in step 521 using the conversation ID and the request ID, and 'wakes up' the command thread to continue executing in step 513. The user input thread from the client then returned to the client so that the client may resume polling the server as needed for the status of the executing command (step 527). The client is then finished with providing the user input to the server (step 528).

FIG. 6 is a flowchart of a process for terminating an asynchronous command request in accordance with the illustrative embodiments. In particular, FIG. 6 illustrates a process that allows the client to terminate a command that is running, usually in response to a cancel operation. The process begins with the server starting execution of a command thread (step 600). Process step 600 is representative of step 511 in FIGS. 5A and 5B. The command thread then creates a new server transaction, which ensures data integrity of any database, cache, and file system operations (step 601). Process step 601 is representative of step 512 in FIGS. 5A and 5B. Once the transaction has begun, the command is executed (step 602). Process step 602 is representative of step 513 in FIGS. 5A and 5B.

At some point during execution of the command, the client may want to terminate the running command (step 607). To terminate the command, the client sends a termination request to the server for an asynchronous command service (step 608). The termination request includes the conversation ID of the command that the client received when the command was initiated by the server. When the server receives the request to terminate the command, the server locates the command using the conversation ID passed with the request and terminates the running command (step 609). The server sets the termination flag in the command thread, and the termination request returns (step 610). The server is then finished with processing the termination request (step 611).

Responsive to the server setting the termination flag in step 610, the command thread detects the termination flag (step 603). When the command thread detects the termination flag, the command thread throws an exception and rolls back the transaction (step 604). The thread and other system resources are then released (step 605), and the server is then finished with executing the command thread (step 606).

Figure 7A:
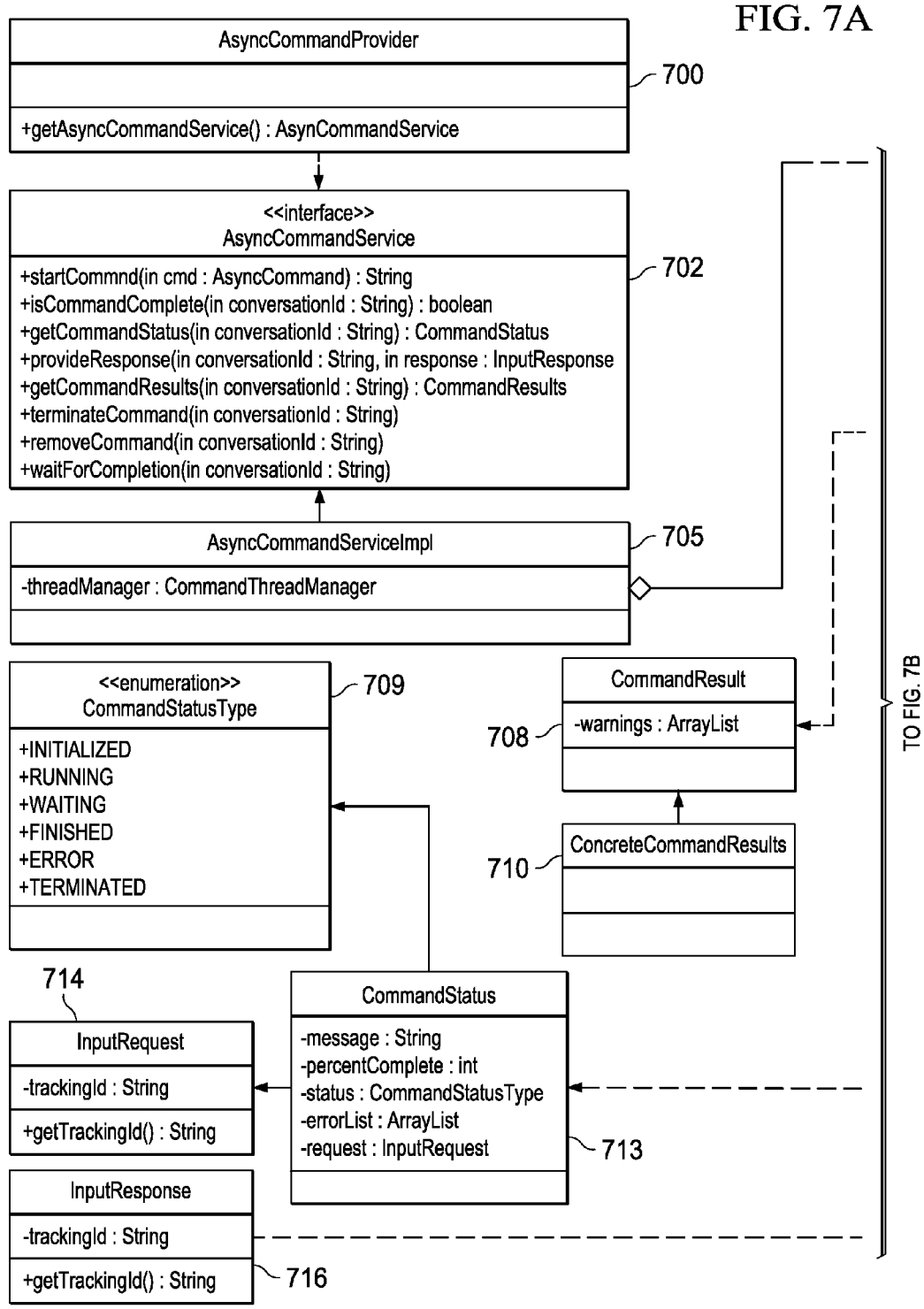
FIGS. 7A and 7B illustrate an exemplary server object model of the server-resident processing of asynchronous commands in accordance with the illustrative embodiments.
Figure 7B:
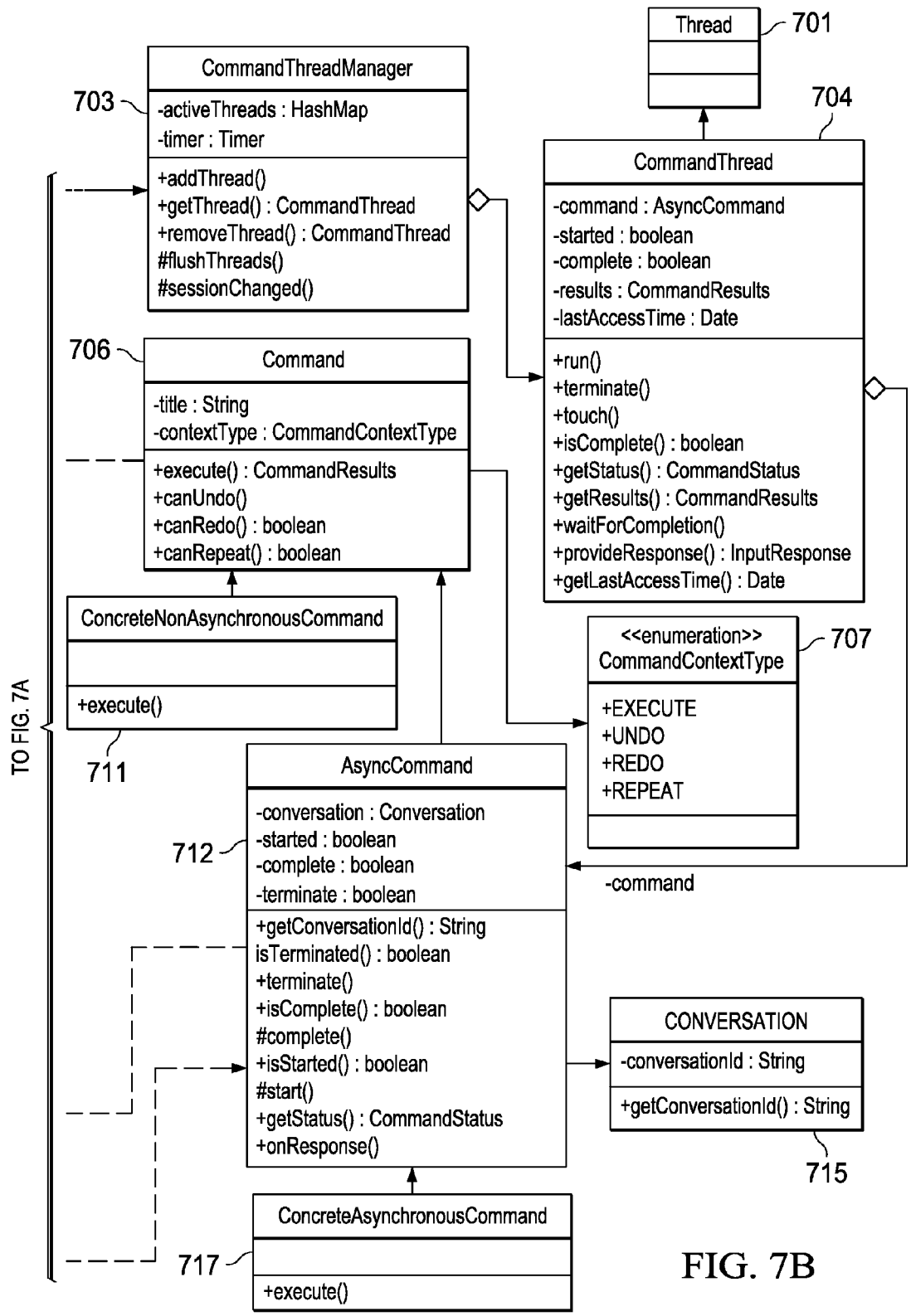

FIGS. 7A and 7B illustrate an exemplary server object model of the server-resident processing of asynchronous commands in accordance with the illustrative embodiments. Command objects are created for each type of user operation by deriving a concrete class for each operation. When the operation is simple and executes in a short period of time, Concrete class 710 is derived directly from Command class 706. When the operation may be long-running and/or may require user input as it executes, Concrete class 717 is derived from AsyncCommand subclass 712, which provides asynchronous behavior.

Each command, whether derived directly from Command class 706 or indirectly through AsyncCommand subclass 712, generates a CommandResults object 708 to return the result of the operation. Often, a concrete results class 710 must be derived from CommandResults 708 in order to return command-specific information to the requesting client.

Each asynchronous command is executed in the context of a command thread object 704, which is derived from a system-provided Thread class 701. The command thread provides an interface for accessing its commands and also for controlling its execution, such as a terminate( ) method, that sets a flag in the command, allowing the command to terminate. The command thread is identified by a Conversation object 715, which contains a unique conversation ID.

The asynchronous command not only generates a results object 710 when the asynchronous command is finished, but the asynchronous command also generates a command status object 713 upon request to inform the client of the command's progress. The command status object may include information such as percentage complete, and a formatted message for the client for display to the user. The command status object also may contain an optional InputRequest object 714, which the client responds to in order for the command to continue executing. The client returns an InputResponse object 716, which provides the information in a derived class. The InputRequest 714 and the InputResponse 716 objects are correlated by the command with the unique tracking ID that is generated for the request.

Command threads 704 are coordinated by a CommandThreadManager 703 that maintains a registry of conversation IDs and a list of command threads. When the command thread is started, a lastAccessTime attribute is initialized to allow tracking threads which may have been abandoned and their corresponding cleanup. Each time a thread is accessed, the thread's lastAccessTime attribute is updated to renew its timeout.

The command thread manager is in turn, managed by the asynchronous command service Implementation object 705 which implements the abstract interface AsyncCommandService 702 to hide the asynchronous command service object's details from the requesting client. The AsyncCommandServiceImpl class 705 provides implementations of the methods for starting a command, checking on the status of the command, getting the command status results, and terminating the command.

Finally, an AsyncCommandProvider object 700 provides the factory method for obtaining an asynchronous command service, which is wrapped in a transaction context for use by the service front-end to the client.

Figure 8B:
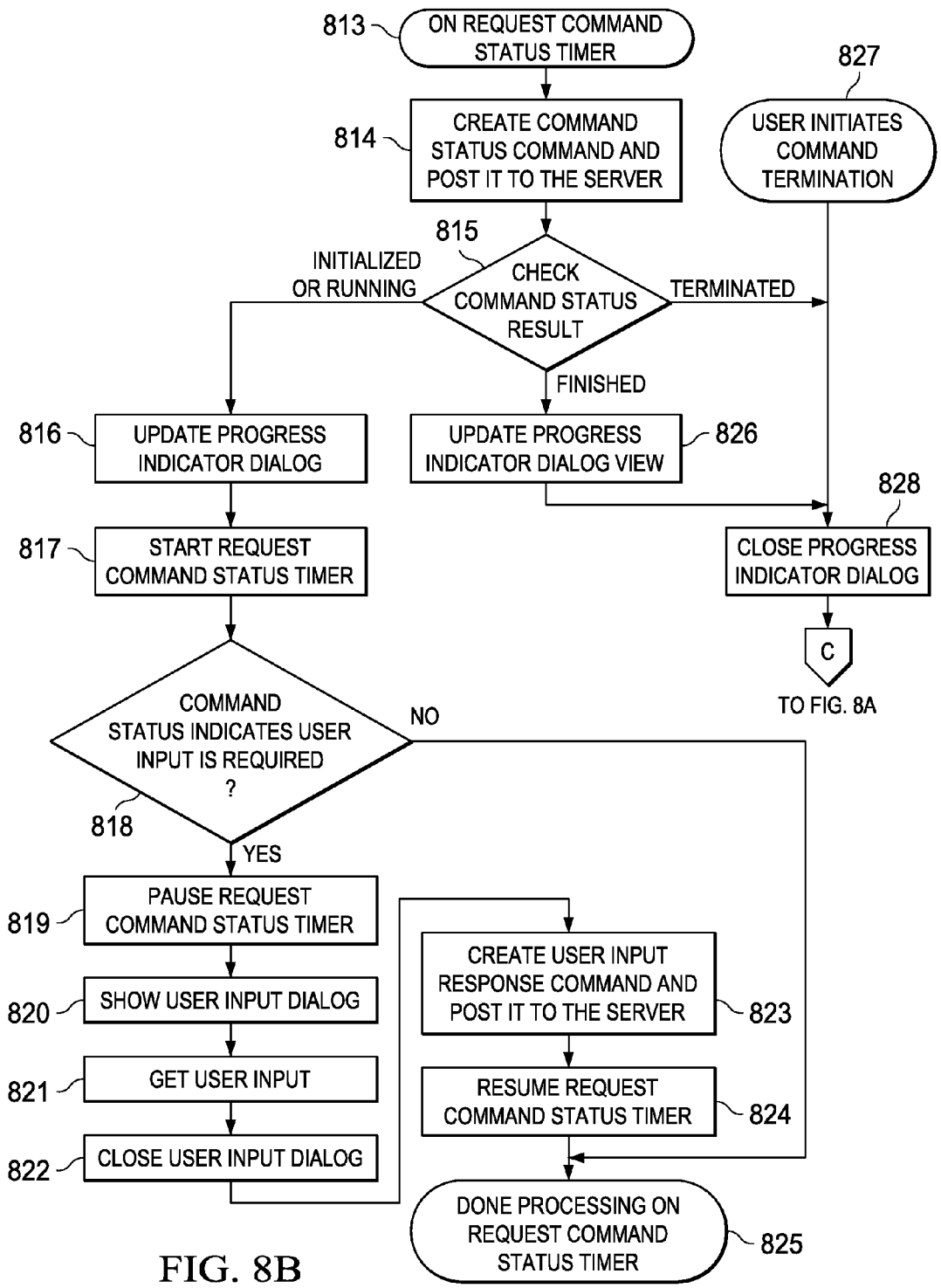

FIGS. 8A and 8B show a flowchart of a process illustrating the client-side tracking of server command execution in accordance with the illustrative embodiments. The process in FIGS. 8A and 8B may be implemented in web client 302 in FIG. 3.

The process begins when a user initiates a command (step 800). The client then constructs a command object and posts the command object to the server (step 801). The client then waits for a response from the server (step 802). If the server determines that the command is going to be run asynchronously, since the execution of the command is long-running or the command requires input from the user, the response from the server may comprise a conversation ID that is created by the server and associated with the server command instance.

When the client receives the response from the server, the client examines and processes the response (step 803). A determination is made by the client as to whether the response comprises a conversation ID (step 804). If the response does not comprise a conversation ID ('no' output of step 804), the client extracts the command execution results from the response (step 805). The client then updates the client view based on the results in the response (step 806). The client is then finished with executing the command (step 807).

Turning back to step 804, if the response does comprise a conversation ID ('yes' output of step 804), the client displays the progress of the running command in a progress indicator dialog window, such as dialog 400 in FIG. 4 (step 808). The dialog is responsible for periodically querying the status of the command running on the server and passing the conversation ID to the server to enable the server to identify the command. To achieve this querying, the client initializes and starts a request command status timer (step 809). The request command status timer is used to periodically fire an 'on request command status' event that signals to the dialog that a new command status should be requested by the client. The client then waits for the command to finish executing and subsequently for the progress indicator dialog to close (step 810).

A determination is then made by the client as to whether the user has indicated a desire to terminate execution of the command, such as by selecting Cancel button 402 in dialog 400 in FIG. 4 (step 811). The user may at any time indicate that termination of the command is desired. If the user has not indicated a desire to terminate execution of the command ('no' output of step 811), the client then updates the client view to reflect data changes resulting from command execution (step 806), and finishes with executing the command (step 807). For example, in the case of paste operation of tasks, a view of hierarchy of tasks may be updated to reflect the resulting state of the hierarchy after paste is completed. However, if the user has indicated a desire to terminate execution of the command ('yes' output of step 811), the client creates a cancel command request that includes the conversation ID and posts the request to the server to terminate execution of the command (step 812). The client then updates the client view based on to reflect data changes resulting from command execution (step 806). For instance, in certain cases of paste operations (when name conflicts were resolved by user input), the cancel operation may roll back only the changes that occurred between last user input and termination moment (e.g., the user pressing the cancel button on the progress indicator dialog). The client then finishes with executing the command (step 807).

During any point in the execution of the command, the user may select Cancel button 402 on dialog 400 in FIG. 4, indicating that termination of the command is desired (step 827). When the user terminates the command by selecting the cancel button, the client closes the progress indicator dialog (step 828), with the process continuing to step 811. Since the user has indicated command termination in step 811, the client creates a cancel command request object that includes conversation ID and posts the object to the server (step 812). In the example of a paste operation, a partial paste may have been performed before the user terminated the paste command, so the client view may be updated with the partial paste information (step 506), and command execution completes (step 807).

Upon initializing the request command status timer in step 809, the 'on request command status' event is periodically fired by the timer (step 813). When an event is fired, the progress indicator dialog creates a request command status command object and posts the object to the server (step 814). The response from the server will comprise the status of a running command and optional additional information. The client checks the command status result to determine if the command status is TERMINATED, INITIALIZED or RUNNING, or FINISHED. A command may be terminated by the server for any reason. The TERMINATED status is returned to the client to indicate that the command on the server is terminated and no further command progress or status updates will occur. If the command status is TERMINATED, the progress indicator dialog is closed immediately (step 828), with the process continuing to step 811. If the command status is FINISHED, the client updates the progress indicator dialog view with the command status results (step 526) (i.e., command completed successfully), with the process continuing to step 811. If the command status is INITIALIZED or RUNNING, the client updates the progress indicator dialog view with the command status results (step 816) and the request command status timer is started (step 817).

A determination is then made by the client as to whether the command status indicates whether user input is required in order to continue execution of the command (step 818). For instance, in the example of a paste command, an additional flag in the command status result may be used to indicate that a user input is required to resolve a name conflict as well as indicate a tracking ID. If no user input is required ('no' output of step 818), the client is finished processing the "on request command status" timer event (step 825). If user input is required ('yes' output of step 818), the client pauses the request command status timer (step 819). The client displays a user input dialog, such as user input dialog 403 in FIG. 4 (step 820). The client obtains the user input from the user (step 821) and then closes the user input dialog (step 822). Next, the client creates a user input response command object that includes user input data and tracking ID and posts the object to the server (step 823). The client then resumes the request command status timer (step 824). This process of querying for command status may be repeated until either command reaches FINISHED status or user terminates the command prematurely.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for executing a remote command in a stateless client/server environment, the computer implemented method comprising:

receiving, at a server, a request thread for a command from a user at a client; determining whether to process the request thread synchronously or asynchronously;

responsive to a determination to process the request thread synchronously, blocking further requests from the client until execution of the command is completed and a result is returned to the client;

responsive to a determination to process the request thread asynchronously, launching an asynchronous thread of execution for the command to form a command thread;

creating a conversation identifier for identifying the command thread;

responsive to executing the command thread, determining that a conflict in execution of the command thread exists;

responsive to a determination that a conflict exists, halting execution of the command thread;

creating a user input request, wherein the user input request includes a user input request identifier, and wherein the user input request requests a user to provide a resolution to the conflict in the execution of the command thread;

sending the user input request with the user input request identifier and the conversation identifier to the user at the client;

responsive to receiving a response from the client comprising the user input request identifier, the conversation identifier, and a user input that resolves the conflict, processing the user input at the server; and resuming execution of the command thread based on the user input.

2. The computer implemented method of claim 1, wherein processing the user input at the server further comprises:

locating the user input request associated with the user input based on the user input request identifier;

locating the command thread associated with the user input request based on the conversation identifier; and processing the user input against the command thread.

3. The computer implemented method of claim 1, further comprising:

committing changes made from execution of the command thread to a database.

4. The computer implemented method of claim 1, further comprising:

responsive to detecting, at the server, a user input canceling execution of the command thread, atomically rolling back changes made from execution of the command thread.

5. The computer implemented method of claim 4, wherein detecting the user input canceling execution of the command thread further comprises:

receiving, at the server, a command termination request from the client, wherein the command termination request comprises the conversation identifier of the command thread;

locating the command thread based on the conversation identifier passed in the command termination request; and setting a termination flag in the command thread, wherein detection of the termination flag by the command thread throws an exception and rolls back the changes made from executing the command thread.

6. The computer implemented method of claim 1, further comprising:

receiving a command status request from the client, wherein the command status request comprises the conversation identifier of the command thread;

locating the command thread based on the conversation identifier passed in the command status request;

retrieving an execution status from the located command thread; and sending the execution status of the command thread to the client.

7. The computer implemented method of claim 6, wherein the client periodically polls the server for the execution status of the command thread.

8. The computer implemented method of claim 1, further comprising:

responsive to receiving, at the client, the user input request from the server, prompting the user to provide a user input to resolve the conflict in the execution of the command thread;

collecting the user input from the user; and sending the collected user input with the user input request identifier and the conversation identifier to the server.

9. The computer implemented method of claim 1, wherein determining whether to process the request thread synchronously or asynchronously is performed by an adaptive server, and wherein the adaptive server makes the determination of whether to process the request thread synchronously or asynchronously based on an estimated cost of processing the request thread.

10. The computer implemented method of claim 1, wherein the stateless client/server environment is a web services environment.

11. A data processing system for executing a remote command in a stateless client/server environment, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to receive, at a server, a request thread for a command from a user at a client; determine whether to process the request thread synchronously or asynchronously; block, in response to a determination to process the request thread synchronously, further requests from the client until execution of the command is completed and a result is returned to the client; launch, in response to a determination to process the request thread asynchronously, an asynchronous thread of execution for the command to form a command thread; create a conversation identifier for identifying the command thread; determine, in response to executing the command thread, that a conflict in execution of the command thread exists; halt, in response to a determination that a conflict exists, execution of the command thread; create a user input request, wherein the user input request includes a user input request identifier, and wherein the user input request requests a user to provide a resolution to the conflict in the execution of the command thread; send the user input request with the user input request identifier and the conversation identifier to the user at the client; process, in response to receiving a response from the client comprising the user input request identifier, the conversation identifier, and a user input that resolves the conflict, the user input at the server; and resume execution of the command thread based on the user input.

12. A computer program product for executing a remote command in a stateless client/server environment, the computer program product comprising:

a non-transitory computer readable medium having computer usable program code stored thereon, the computer usable program code comprising:

computer usable program code for receiving, at a server, a request thread for a command from a user at a client;

computer usable program code for determining whether to process the request thread synchronously or asynchronously;

computer usable program code for blocking, in response to a determination to process the request thread synchronously, further requests from the client until execution of the command is completed and a result is returned to the client;

computer usable program code for launching, in response to a determination to process the request thread asynchronously, an asynchronous thread of execution for the command to form a command thread;

computer usable program code for creating a conversation identifier for identifying the command thread;

computer usable program code for determining, in response to executing the command thread, that a conflict in execution of the command thread exists;

computer usable program code for halting, in response to a determination that a conflict exists, execution of the command thread;

computer usable program code for creating a user input request, wherein the user input request includes a user input request identifier, and wherein the user input request requests a user to provide a resolution to the conflict in the execution of the command thread;

computer usable program code for sending the user input request with the user input request identifier and the conversation identifier to the user at the client;

computer usable program code for processing, in response to receiving a response from the client comprising the user input request identifier, the conversation identifier, and a user input that resolves the conflict, the user input at the server; and computer usable program code for resuming execution of the command thread based on the user input.

13. The computer program product of claim 12, wherein the computer usable program code for processing the user input at the server further comprises:

computer usable program code for locating the user input request associated with the user input based on the user input request identifier;

computer usable program code for locating the command thread associated with the user input request based on the conversation identifier; and computer usable program code for processing the user input against the command thread.

14. The computer program product of claim 12, further comprising:

computer usable program code for committing changes made from execution of the command thread to a database.

15. The computer program product of claim 12, further comprising:

computer usable program code for atomically rolling back changes made from execution of the command thread in response to detecting, at the server, a user input canceling execution of the command thread.

16. The computer program product of claim 15, wherein the computer usable program code for detecting the user input canceling execution of the command thread further comprises:

computer usable program code for receiving, at the server, a command termination request from the client, wherein the command termination request comprises the conversation identifier of the command thread;

computer usable program code for locating the command thread based on the conversation identifier passed in the command termination request; and computer usable program code for setting a termination flag in the command thread, wherein detection of the termination flag by the command thread throws an exception and rolls back the changes made from executing the command thread.

17. The computer program product of claim 12, further comprising:

computer usable program code for receiving a command status request from the client, wherein the command status request comprises the conversation identifier of the command thread;

computer usable program code for locating the command thread based on the conversation identifier passed in the command status request;

computer usable program code for retrieving an execution status from the located command thread; and computer usable program code for sending the execution status of the command thread to the client.

18. The computer program product of claim 12, further comprising:

computer usable program code for prompting the user to provide a user input to resolve the conflict in the execution of the command thread, in response to receiving, at the client, the user input request from the server;

computer usable program code for collecting the user input from the user; and computer usable program code for sending the collected user input with the user input request identifier and the conversation identifier to the server.

19. The computer program product of claim 12, wherein the determination whether to process the request thread synchronously or asynchronously is performed by an adaptive server, and wherein the adaptive server makes the determination of whether to process the request thread synchronously or asynchronously based on an estimated cost of processing the request thread.

20. The computer program product of claim 12, wherein the stateless client/server environment is a web services environment.

* * * * *